United States Patent [19]

Ikenoya

[11] Patent Number: 4,531,928
[45] Date of Patent: Jul. 30, 1985

[54] BELT TRANSMISSION HAVING AIR COOLING FUNCTION

[75] Inventor: Yasuo Ikenoya, Kawagoe, Japan

[73] Assignee: Honda Giken Kogyo Kabushiki Kaisha, Tokyo, Japan

[21] Appl. No.: 450,988

[22] Filed: Dec. 20, 1982

[30] Foreign Application Priority Data

| Dec. 23, 1981 | [JP] | Japan | 56-192063[U] |
| Dec. 24, 1981 | [JP] | Japan | 56-194390[U] |
| Dec. 24, 1981 | [JP] | Japan | 56-211799 |
| Dec. 29, 1981 | [JP] | Japan | 56-194810[U] |
| Jan. 18, 1982 | [JP] | Japan | 57-5836 |
| Mar. 1, 1982 | [JP] | Japan | 57-28618[U] |

[51] Int. Cl.³ ............................................. F16H 57/04
[52] U.S. Cl. ........................................ 474/93; 474/146; 180/229
[58] Field of Search ............... 474/13, 93, 144, 146, 474/149, 150; 180/219, 229, 231; 280/261, 289 G; 74/606 A

[56] References Cited

U.S. PATENT DOCUMENTS

| 1,950,034 | 3/1934  | Mulford et al. | 74/606 A |
| 2,145,545 | 1/1939  | Johnson et al. | 474/93 |
| 2,315,317 | 3/1943  | Copp et al.    | 74/606 A |
| 2,842,974 | 7/1958  | Neumann        | 474/93 |
| 3,229,424 | 1/1966  | Fairchok       | 474/93 |
| 3,659,470 | 3/1972  | Beaudoin       | 474/13 |
| 3,943,785 | 3/1976  | Perifield      | 474/93 |
| 4,304,150 | 12/1981 | Lupo et al.    | 474/70 |
| 4,319,657 | 3/1982  | Nomura         | 180/219 |

FOREIGN PATENT DOCUMENTS 0024373  3/1981  European Pat. Off. ........... 180/231

Primary Examiner—Stephen J. Novosad
Assistant Examiner—Bruce M. Kisliuk
Attorney, Agent, or Firm—Arthur L. Lessler

[57] ABSTRACT

A cooling fan is provided on at least one of the drive pulley and the driven pulley which are drivingly coupled together by means of a belt. The casing in which the pulleys and the belt are accommodated is provided with air inlet port means and air outlet port means. Rotation of the cooling fan in unison with rotation of the pulley provided with the cooling fan causes fresh air to be forcibly sucked into the casing through the air inlet port means, and discharged to the outside through the air outlet port means after cooling the pulleys and the belt. The air inlet port means and the air outlet port means are arranged or constructed so as to prevent intrusion of dust, mud, water, etc. into the casing. Further provided are means for enhancing the efficiency of cooling the driven pulley by the fresh air drawn in as well as means for radiating heat generated within the casing through the casing walls.

19 Claims, 9 Drawing Figures

BELT TRANSMISSION HAVING AIR COOLING FUNCTION

BACKGROUND OF THE INVENTION

This invention relates to a belt transmission such as an automatic belt transmission for motorcycles or other vehicles, and more particularly to cooling arrangements for cooling the component parts of such a power transmission.

In motorcycles equipped with small output engines where small torque is transmitted to the driving wheel, a drive belt, which is made of rubber as a base material, is used to transmit rotation of the crankshaft of the engine to the driving wheel. An automatic belt transmission, which uses such drive belt, is generally employed to change the engine speed. A typical automatic belt transmission is adapted to steplessly change the speed ratio between a drive pulley on the crankshaft side and a driven pulley on the driving wheel side in such a manner that the drive pulley has its pitch diameter automatically changed due to centrifugal force which is generated by rotation of the crankshaft, and the change of the pitch diameter causes a corresponding change in the tension of a belt wound on the pulleys, which in turn causes a change in the pitch diameter of the driven pulley.

The above automatic belt transmission is rather simple in construction and can nevertheless perform transmission in a stepless manner. Therefore, it is very advantageous to apply such automatic belt transmissions to vehicles such as motorcycles, which are required to be compact in size and inexpensive, and also have a wide working speed range.

However, according to the above type automatic belt transmission, the efficiency of transmission of power from the engine to the driving wheel is determined by the product of the coefficient of friction of the belt and the urging force of the belt against the pulleys. Consequently, if the urging force of the belt against the pulleys is set to a large value in order to obtain large power transmission efficiency, a great deal of friction heat can be generated at the contacting portions of the belt and the pulleys, to cause overheating of the belt. Thus, the automatic belt transmission has limited maximum power transmission efficiency, which imposes substantial limitations upon the output and total stroke volume of an engine to be installed on a vehicle to which the automatic belt transmission is applied.

Furthermore, the transmission mechanism is accommodated within an enclosed casing in a manner isolated from the outside, so as to avoid intrusion of dust, mud, water, etc. into the casing for protection of the transmission mechanism. This arrangement can cause a rise in the temperature inside the casing in cooperation with the generated friction heat to promote the overheating of the belt, which can result in a shortened service life of the rubber base belt.

SUMMARY OF THE INVENTION

It is a primary object of the invention to provide a belt transmission which is provided with a cooling device adapted to forcedly suck fresh air into the transmission casing for cooling of the interior of same and then forcedly discharge the fresh air to the outside so as to avoid overheating of the belt, to thereby ensure a longer service life of the belt as well as higher transmission efficiency than conventional belt transmissions.

It is a further object of the invention to provide a belt transmission which is constructed such that only clean fresh air free of dust, mud, rain water, splashed washing water, etc. can be introduced into the transmission casing, whereby component parts in the casing can be prevented from being damaged by the above extraneous substances and therefore have longer service lives.

It is another object of the invention to provide a belt transmission which is constructed such that fresh air introduced into the transmission casing can be dispersedly distributed throughout the whole driven pulley into sufficient contact therewith, to obtain a high degree of cooling of the driven pulley to further restrain overheating of the belt.

It is a still further object of the invention to provide a belt transmission which is constructed such that heat generated in the transmission casing can be effectively transferred to the casing walls, which in turn can well radiate heat from their outer surfaces into the atmosphere.

It is a further object of the invention to provide a belt transmission which is simple in construction, easy to assemble or manufacture and low in manufacturing cost.

The above and other objects, features and advantages of the invention will be more apparent from the ensuing detailed description taken in connection with the accompanying drawings.

DETAILED DESCRIPTION

The invention will now be described in detail with reference to the accompanying drawings wherein an embodiment of the invention is illustrated.

Figure 1:
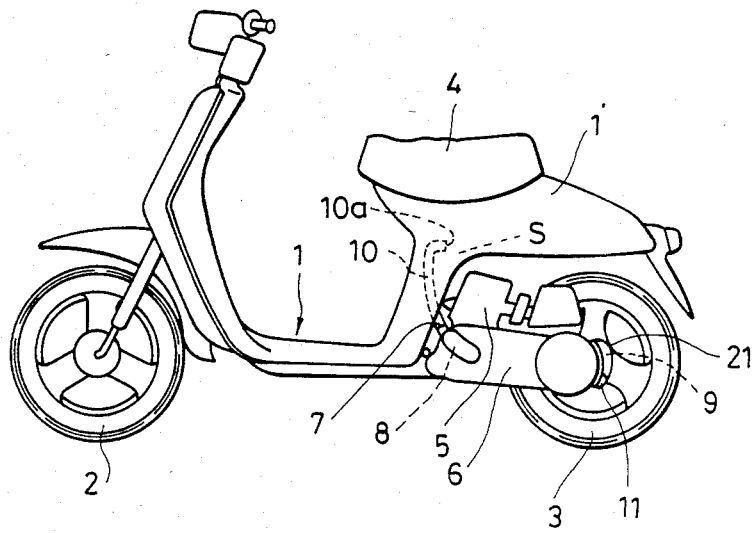
FIG. 1 is a schematic side view illustrating a motorcycle equipped with an automatic belt transmission to which the present invention is applied.
Figure 2:
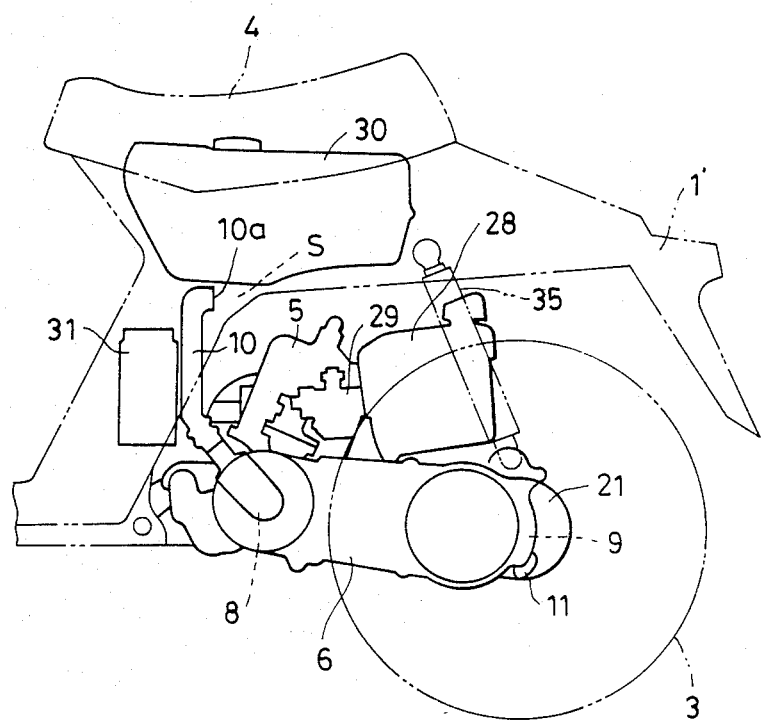
FIG. 2 is a schematic side view, on an enlarged scale, of a portion of the motorcycle below a body cover under the seat of a motorcycle of FIG. 1.

Referring first to FIGS. 1 and 2, there are illustrated a whole construction and an essential part of a motorcycle which is equipped with an automatic belt transmission to which the invention is applied. In FIG. 1, a body 1 carries a steering or front wheel 2 and a driving or rear wheel 3. A seat 4 is arranged on a body cover 1' which forms part of the body 1, and an engine 5 is arranged on the body at a lower portion of the body cover 1'. The automatic belt transmission is accommodated within a casing 6 which is arranged at a lateral side of the body 1 and horizontally extends from the engine 5 toward the driving rear wheel 3. The transmission is drivingly coupled to the engine 5, while it can be drivingly coupled to the driving rear wheel 3. The casing 6 is joined integrally to the engine assembly as described later, and the engine assembly has its front end portion movably suspended from the frame of the body 1 by means of a hanger member, not shown, which is pivotably connected between the body frame and the engine assembly, while it also has its rear end portion movably suspended from the body frame by means of a rear cushion 35, shown in FIG. 2, to thus restrain transmission of vibrations of the engine 5 during operation. The casing 6 is formed with a fresh air intake passage 8 having an inlet open end 7 at a front location and a fresh air discharge passage 9 having an air outlet port 11 at a rear location. A suction tube 10, which has its free end formed as an air inlet port 10a, is connected to the inlet open end 7, and is disposed to have its air inlet port 10a located in an internal space S which is enclosed by the body cover 1' and the seat 4. On the other hand, the fresh air discharge passage 9 has its lower end communicating with the air outlet port 11 which has opposite left and right open ends opening laterally of the motorcycle. The above internal space S is substantially closed in a manner preventing intrusion of extraneous dust, mud, water, etc. into the space for protection of the main component parts arranged within the space S, which include the engine 5, an air cleaner 28, a carburetor 29, a fuel tank 30, and a battery 31.

Figure 3:
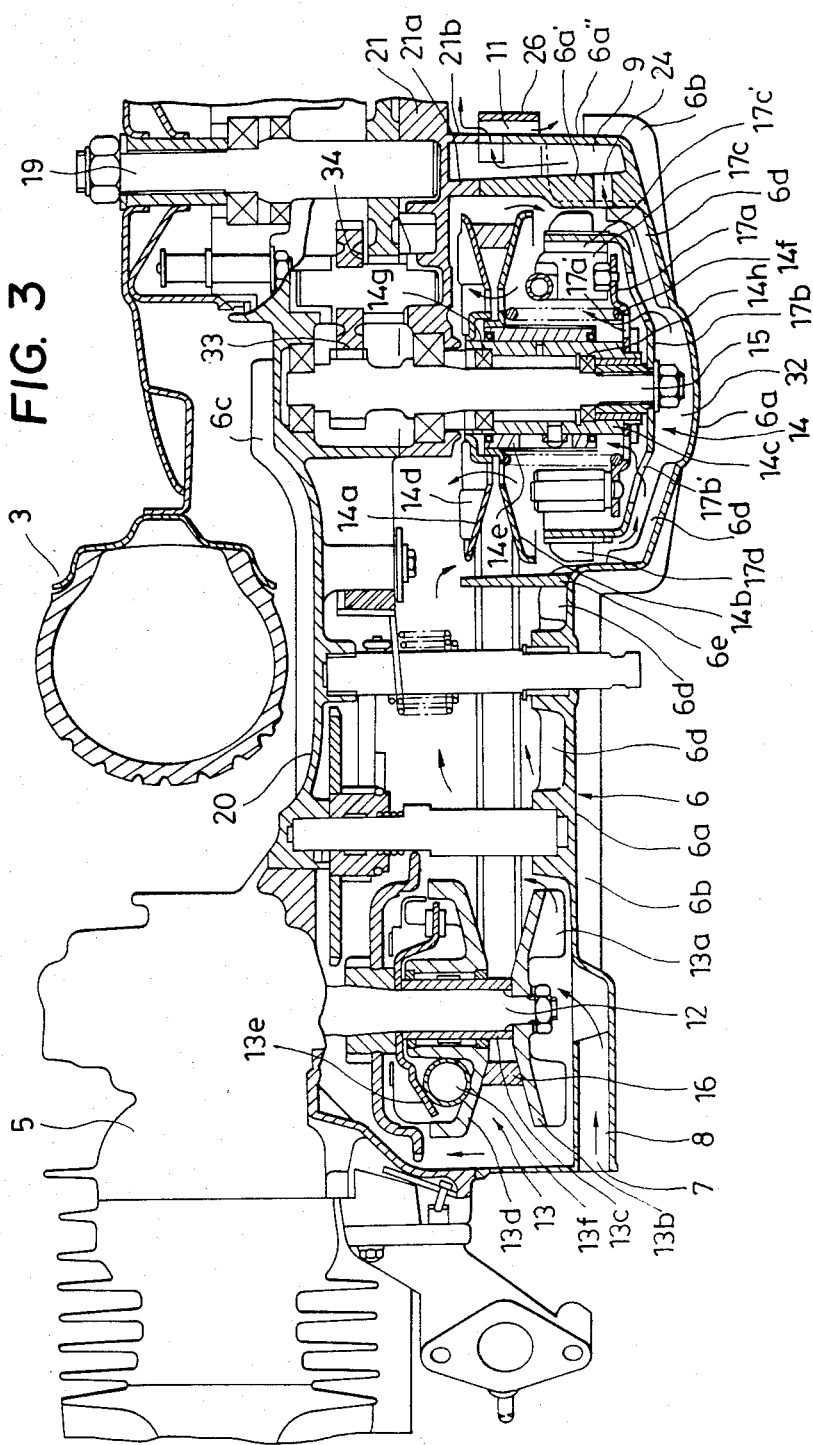
FIG. 3 is a horizontal sectional view illustrating the internal arrangement of an automatic belt transmission according to an embodiment of the present invention.

As shown in FIGS. 2 and 3, the transmission has its drive pulley 13 located at an end of the casing 6 and coupled to an end of the crankshaft 12 of the engine 5. The drive pulley 13 comprises a stationary drive face element 13b secured on the crankshaft 12, which carries a plurality of vanes 13a circumferentially arranged on its outer side surface and forming a cooling fan, a collar 13c fitted on the crankshaft 12, a movable drive face element 13d axially movably fitted on the collar 13c in concentric and facing relation to the stationary face element 13b, a ramp plate 13e secured on the crankshaft 12, and a weight roller 13f interposed between the movable drive face element 13d and the ramp plate 13e. Preferably, at least the stationary drive face element 13b and the movable drive face element 13d are cast from aluminum which generally has high heat conductivity. The weight roller 13f is displaceable radially of the crankshaft 12 due to its own centrifugal force which is variable in response to the rotational speed of the engine 5, to urgingly axially move the movable drive face element 13d to vary the gap between the two drive face elements 13b and 13d. This gap determines the pitch diameter of the drive pulley 13, i.e. the distance between an associated turning portion of a belt 16 interposedly engaged by the drive face elements 13b and 13d and the diametrical center of the drive pulley 13 or the crankshaft 12. Thus, the pitch diameter of the drive pulley 13 varies in response to changes in the rotational speed of the engine 5.

On the other hand, a driven pulley 14 is arranged in the casing 6 at its other end, which comprises a stationary driven face element 14a and a movable driven face element 14b as principal components. The stationary driven face element 14a is secured on an end of a boss 14c in the form of a sleeve, rotatably fitted on a driven shaft 15 and has its outer side surface formed with a plurality of vanes 14d circumferentially arranged and forming a cooling fan. The movable driven face element 14b is secured on a cam 14e in the form of a sleeve, axially movably fitted on the boss 14c and disposed in concentric and facing relation to the stationary driven face element 14a. The movable driven face element 14b is urged toward the stationary driven face element 14a by a coil spring 14f compressedly interposed between the movable driven face element 14b and a clutch plate 17a, hereinafter referred to. The distance between the stationary driven face element 14a and the movable driven face element 14b, which determines the pitch diameter of the driven pulley 14, is variable in dependence upon the tension of the belt 16 wound around the drive pulley 13 and the driven pulley 14 and the urging force of the coil spring 14f and is kept constant when the belt tension and the spring force balance each other.

The aforementioned clutch plate 17a forming part of a centrifugal clutch 17 is secured on the other end of the boss 14c, while a clutch outer element 17b is secured on an end of the driven shaft 15. A weight assembly 17c is mounted on an outer periphery of the clutch plate 17a, which is radially outwardly displaceable in response to centrifugal force generated by rotation of the driven pulley 14 and when the rotational speed of the pulley 14 exceeds a predetermined value, it brings its shoe 17c' into frictional engagement with an inner peripheral surface of the clutch outer element 17b to cause transmission of the rotation of the driven pulley 14 to the driven shaft 15. The driven shaft 15 has its other end engaging with a final shaft 19 via reduction gears 32 and 33 so that rotation of the driven shaft 15, which is drivingly engaged by the driven pulley 14 as noted above, is transmitted through the reduction gears 33 and 34 and the final shaft 19 to the driving rear wheel 3 in FIGS. 1 and 2 to rotate same. The clutch outer element 17b carries a plurality of vanes 17b circumferentially arranged on its outer periphery and forming a cooling fan. The clutch plate 17a and the clutch outer element 17b are formed, respectively, with through holes 17a and 17b for guiding fresh air therethrough.

Figure 5:
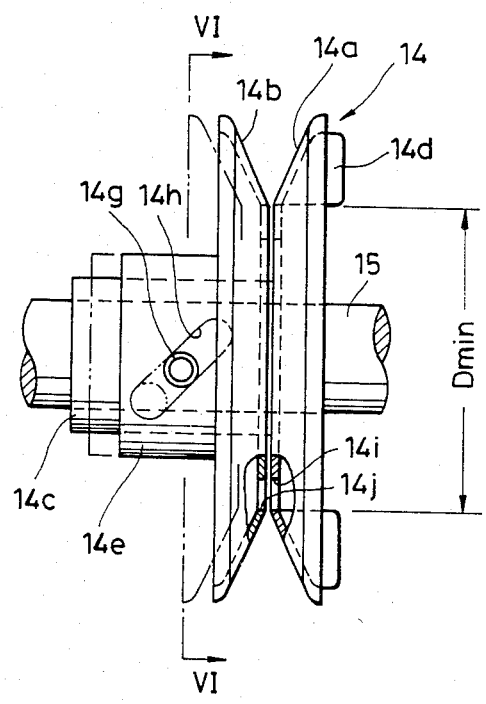
FIG. 5 is a side view illustrating the driven pulley.
Figure 6:
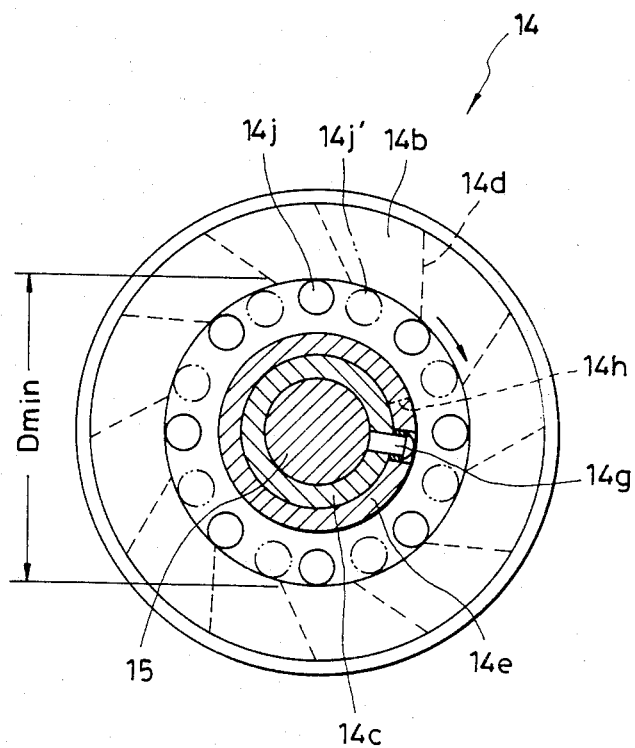
FIG. 6 is a sectional view taken along line VI—VI in FIG. 5.

FIGS. 5 and 6 illustrate in detail the driven pulley 14. A pin 14g is secured on the peripheral wall of the boss 14c and radially outwardly projected into an elongate camming slot 14h formed in the peripheral wall of the cam 14e. The camming slot 14h extends obliquely with respect to the axis of the driven shaft 15 so that as the movable driven face element 14b axially moves relative to the stationary driven face element 14a, the circumferential phase of the driven face element 14b changes with respect to the driven face element 14a. The stationary driven face element 14a and the movable driven face element 14b are formed, respectively, with a plurality of axial through holes 14i and a plurality of axial through holes 14j which open in opposite side surfaces of their respective elements 14a and 14b and are both located at a location radially inward of the level of an inner peripheral surface of an associated turning portion of the belt 16 assumed when the driven pulley 14 has its minimum pitch diameter Dmin, that is, when the movable driven face element 14b is spaced by a maximum distance from the stationary driven face element 14a. The two groups of through holes 14i and 14j are identical in number with each other, and each group of which are circumferentially arranged at equal intervals. Further, the two groups of through holes 14i and 14j are so located relative to each other that as the driven face element 14b moves away from the other driven face element 14a, each of the through holes 14j is circumferentially displaced, and when the distance between the two driven face elements 14a and 14b becomes maximum and accordingly the pitch diameter of the driven pulley 14 becomes minimum, each through hole 14j moves to its position 14j' indicated by the chain line in FIG. 6 where the circumferential distance between each through hole 14j and its corresponding through hole 14i has a maximum value, and when the distance between the two driven face elements 14a and 14b becomes minimum, the above circumferential distance becomes minimum, that is, each through hole 14j and its corresponding through hole 14j are located opposite each other in axial alignment.

Figure 4:
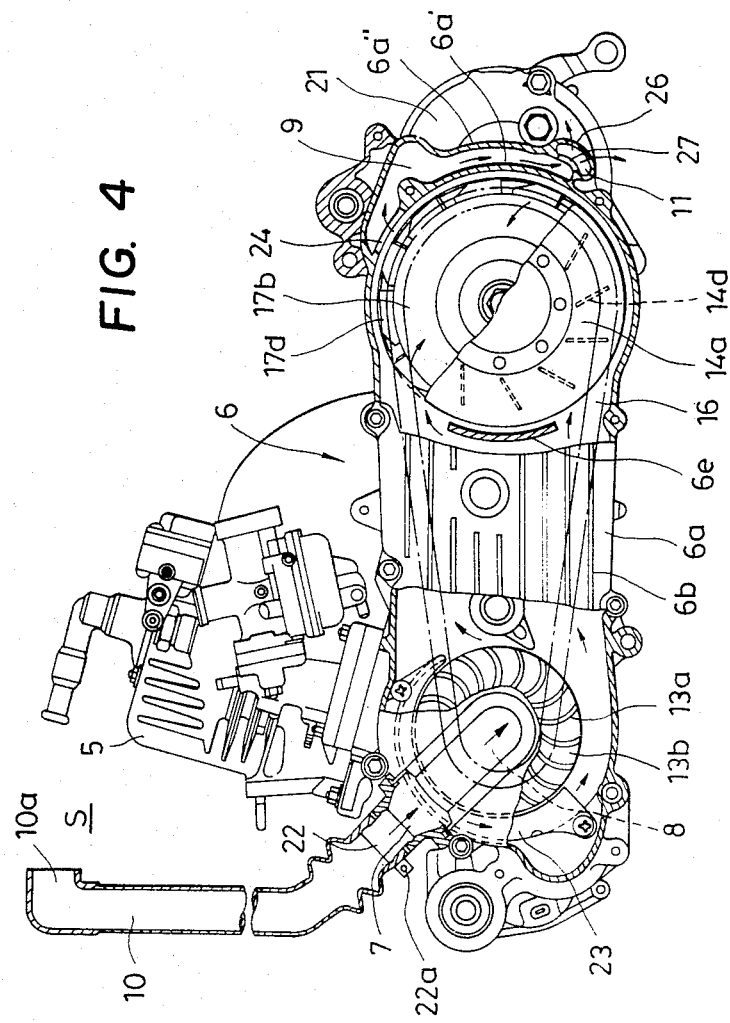
FIG. 4 is a side view, partly in section, of the internal arrangement of the automatic belt transmission of FIG. 3.

The transmission casing 6, which accommodates the automatic belt transmission constructed above, is formed by part of the peripheral walls of a crankcase 20 of the engine 5, part of the peripheral walls of a transmission cover 21, and an exclusive peripheral wall 6a. The exclusive peripheral wall 6a forms an outer wall portion of the transmission casing 6, and has its front end formed with the inlet open end 7 opening in the atmosphere. The fresh air intake passage 8 which extends inward from the inlet open end 7 along an inner surface of the peripheral wall 6a and opens in the casing 6 at a substantially central location of the outer side surface of the drive face element 13b on tip of the crankshaft 12. The fresh air intake tube 10 is connected to the inlet open end 7 by means of a connecting tube 22, as shown in FIG. 4. As previously mentioned, the air inlet port 10a at tip of the tube 10 opens in the internal space S defined by the body cover 1' and the seat 4, which has a closed structure so as not to allow intrusion of dust, mud, water, etc. thereinto. The tube 10 is previously mounted onto the body 1 of the motorcycle, and in installing the engine 5 onto the body 1, it is coupled to the connecting tube 22 and fastened thereto by means of a band 22a or the like. The internal space S is not limitative, but the air inlet port 10a may be disposed to open in any other similar internal space formed in the body 1 in another place, so far as the internal space is so constructed as not to allow easy intrusion of dust, mud, water, etc. thereinto.

A spiral chamber 23 is formed along a front half portion of the drive pulley 13 in the transmission casing 6, which gradually increases in volume in the advancing direction of fresh air blown by the fan 13a on the drive face element 13b.

Figure 9:
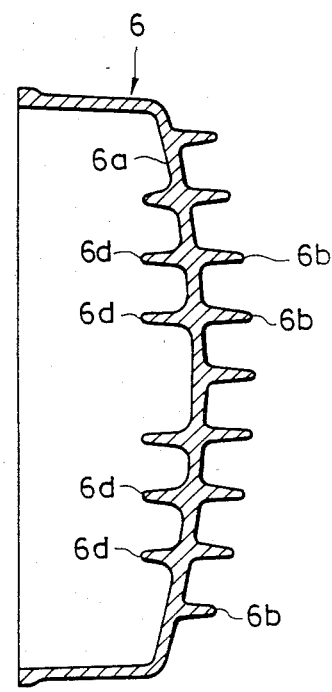
FIG. 9 is a fragmentary sectional view, on an enlarged scale, of a wall portion of the transmission casing.

As shown in FIGS. 3, 4 and 9, a plurality of radiation fins 6b are formed in rows on an outer surface of the peripheral wall 6a of the transmission casing 6 in a manner outwardly projected from the outer surface. Also, a plurality of radiation fins 6c similar to the radiation fins 6b are outwardly projected in rows on an outer surface of the crankcase 20. Preferably, as in the illustrated embodiment, the radiation fins 6a and 6c horizontally linearly extend from a front end portion of the transmission casing 6 to a rear end portion of same. On the other hand, as shown in FIGS. 3 and 9, a plurality of heat collecting fins 6d are formed in rows in an inwardly projected manner on an inner surface of the peripheral wall 6a of the transmission casing 6. Preferably, these heat collecting fins 6d horizontally linearly extend from a location immediately downstream in air flow of the drive pulley 13 to a location in the vicinity of the driven pulley 14, as shown in FIG. 3. Further, similar heat collecting fins 6d are formed in a radially extending manner on an inner surface of the peripheral wall 6a of the casing 6 facing the outer side surface of the clutch outer element 17b of the centrifugal clutch 17.

At a location immediately upstream in air flow of the driven pulley 14, an arcuate rib 6e is erected on the inner surface of the peripheral wall 6a of the casing 6, which is curved toward the driven pulley 14 and circumferentially extends along a front portion of the driven pulley 14 and between upper and lower portions of the belt 16.

Figure 7:
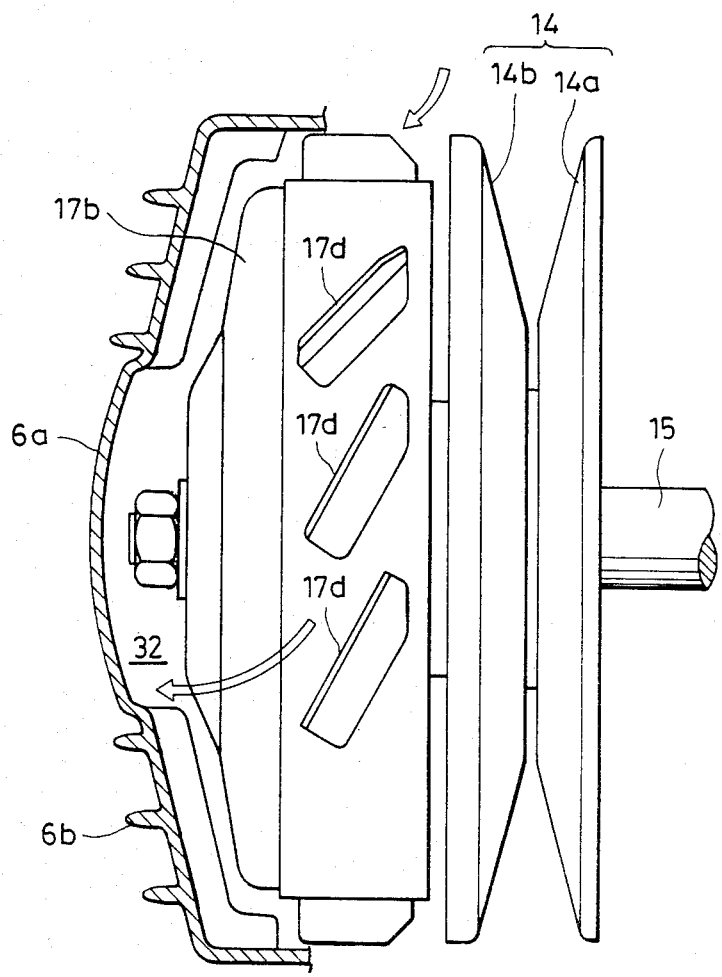
FIG. 7 is a side view, on an enlarged scale, of the centrifugal clutch.
Figure 8:
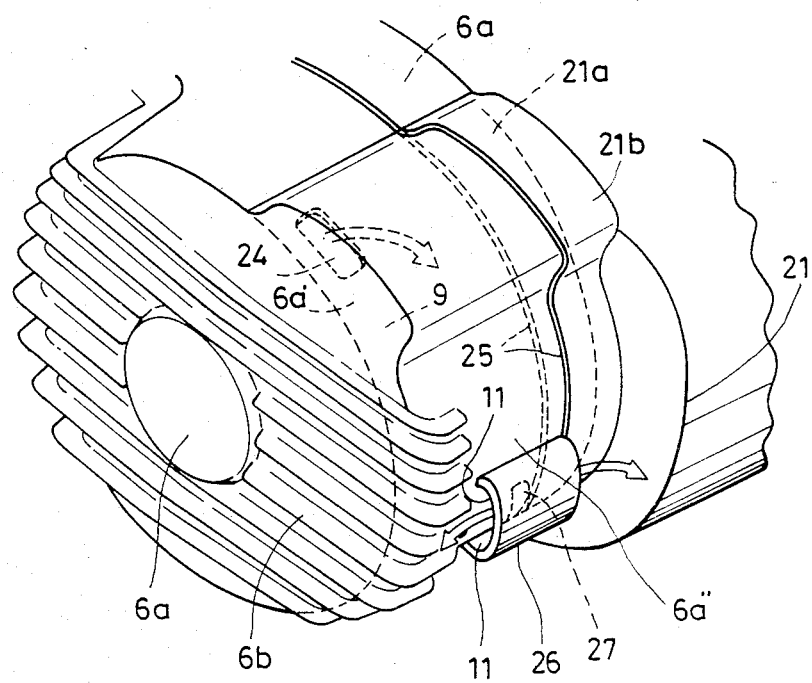
FIG. 8 is a schematic fragmentary perspective view illustrating a portion of the transmission casing provided with an air outlet port.

As best shown in FIG. 7, the transmission casing 6 is outwardly swelled at a portion facing the centrifugal clutch 17, defining a fresh air passage 32 between the outer side surface of the clutch outer element 17b and an associated inner surface of the peripheral wall 6a of the casing 6. As clearly shown in FIG. 3, the peripheral wall 6a has a rear lateral wall portion formed integrally with an inner rear wall 6a' which extends transversely of the casing 6 toward the transmission cover 21 and also circumferentially or vertically extends along rear portions of the driven pulley 14 and the centrifugal clutch 17. The inner rear wall 6a' abuts against a first projecting wall 21a transversely extending integrally from the transmission cover 21 and also circumferentially extending along a rear portion of the driven pulley 14. At a location rearward of the inner rear wall 6a' of the peripheral wall 6, an outer rear wall 6a" extends transversely from the rear lateral wall portion of the peripheral wall 6a and abuts against a second projecting wall 21b extending integrally from the transmission cover 21 transversely and circumferentially or vertically along the first projecting wall 21a. A packing 25 is compressedly interposed between the inner and outer rear walls 6a', 6a" and the first and second projecting walls 21a, 21b to maintain the junctions therebetween fluidtight to prevent intrusion of dust, mud, water, etc. into the fresh air discharge passage 9 through the junctions. The fresh air discharge passage 9 is defined between the abutting inner rear wall 6a' and first projecting wall 21a and the abutting outer rear wall 6a" and second projecting wall 21b, which extends vertically and transversely of the transmission casing 6. The discharge passage 9 communicates at its upper end with the aforementioned fresh air passage 32 through an upper communication hole 24 formed in an upper portion of the inner rear wall 6a'.

Alternatively of the illustrated arrangement, one of the first projecting wall 21a of the transmission cover 21 and the inner rear wall 6a' of the peripheral wall 6a may be omitted, and the other may be integrally extended to the rear lateral wall portion of the peripheral wall 6a or to the transmission cover 21. A similar alternative arrangement to the above may also be applied to the outer rear wall 6a" and the second projecting wall 21b.

A protector 26 having a hollow body with a generally arcuate section is formed integrally on a lower end portion of the outer rear wall 6a" of the transmission casing 6 at a location corresponding to the lower end of the fresh air discharge passage 29. In the illustrated embodiment, the protector 26 has its one end flush with the junction between the outer rear wall 6a" and the second projecting wall 21b, and has its opposite ends opening in the atmosphere as openings of the fresh air outlet port 11. The above lower end portion of the outer rear wall 6a" is formed with a lower communication hole 27, and the fresh air discharge passage 9 communicates with the atmosphere by way of this lower communication hole 27, the interior of the protector 26 and the outlet port 11.

The upper communication hole 24 and the lower communication hole 27 are located in a manner vertically apart from each other as noted above. Two communication holes 24 and 27 are also transversely offset with respect to each other in such a manner that the upper communication hole 24 is located relatively leftward, and the lower communication hole 24 relatively rightward, as seen in FIG. 3. This arrangement effectively prevents easy intrusion of dust, mud, rain water or splashed washing water, etc. into the fresh air discharge passage 9. Further, even if such extraneous substances are intruded into the discharge passage 9, they will not be introduced into the transmission casing 6 due to the arrangement of the upper communication hole 24 at a high level. Furthermore, since the fresh air discharge passage 9 is formed by moldings 6a' and 6a'' integral with the peripheral wall 6a and moldings 21a and 21b integral with the transmission cover 21 as previously noted, the number of component parts can be small, and the manufacture and assemblage of the casing 6 are easy, resulting in a reduced manufacturing cost.

The cooling operation of the above constructed air cooling arrangement of the automatic belt transmission will now be described. As the drive face element 13b of the drive pulley 13 rotates in unison with rotation of the crankshaft 12, the cooling fan formed by the vanes 13a on the drive face element 13b operates to forcibly suck fresh air into the transmission casing 6 at a front end portion, through the air inlet port 10a of the tube 10 opening in the internal space S which is constructed to prevent easy intrusion of dust, mud, water, etc. thereinto, and then through the tube 10, the connecting pipe 22, the inlet open end 7, and the air intake passage 8 in succession. Friction heat, which is generated at the contacting portions of the drive pulley 13 and the drive belt 16, conducts in the component parts of the drive pulley 13 which are formed of aluminum castings excellent in heat conductivity, while simultaneously these component parts are in sufficient contact with the sucked fresh air so that heat exchange between the friction heat and the fresh air is effected to cool the component parts of the drive pulley 13. In addition to the function of sucking fresh air into the transmission casing 6 and feeding it in the rearward direction, the cooling fan formed by the vanes 13a of the drive face element 13b also increases the substantial overall heat convecting surface area of the drive face element 13b to enhance the cooling effect. The fresh air, which has an increased temperature after cooling the drive pulley 13, is then guided in the spiral chamber 23, which gradually increases in volume in the air flow direction, without a substantial loss in its velocity as well as in its flow rate, and hence delivered to rearward zones. As the fresh air is delivered toward rearward zones, it is partially brought into contact with the drive belt 16 to cool same, and partially transfers heat to the peripheral wall 6a of the transmission casing 6 and the wall of the crankcase 20, for radiation of the heat to the outside. On this occasion, the peripheral wall 6a of the casing 6, which has a large heat collecting surface area due to the presence of the heat collecting fins 6d formed on the inner surface of the peripheral wall 6a, effectively collects the heat from the warm fresh air. Further, the radiation fins 6b and 6c formed on the outer surfaces of the peripheral wall 6a and the crankcase 20, which give an increased heat radiating surface area to the walls of the transmission casing 6, effectively radiate the heat into the atmosphere. The fresh air delivered to rearward zones in the transmission casing 6 is dispersed by the arcuate rib 6e located immediately forwardly of the driven pulley 14 to be distributed over a greater part of the outer periphery of the driven pulley 14 and then guided toward the fan 17d on the clutch outer element 17b. In the above described manner, the drive belt 16 and the driven pulley 14 are effectively cooled by the fresh air without being overheated.

Part of the fresh air guided to the clutch outer fan 17d is forcibly guided to the central portion of the outer surface of the clutch outer element 17b by the rotating cooling fan 17d on the clutch outer element 17b, and then guided through the through holes 17b' in the clutch outer element 17b and the through holes 17a' in the clutch plate 17a into the interior of the centrifugal clutch 17 and the driven pulley 14, by suction force generated by the rotating cooling fan 14d on the driven face element 14a of the driven pulley 14. The cooling fan 14d serves to effectively radiate heat from the fresh air and also rectify the flow of the fresh air. The cooled fresh air guided into the interior of the driven pulley 14 forcedly collides against the movable driven face element 14b and is guided through the through holes 14j and 14i in the driven face elements 14b and 14a. In this manner, the fresh air is brought into contact with various component parts of the driven pulley having a large overall heat convecting surface area to be effectively cooled with a high cooling efficiency. In passing the through holes 14j and 14i, the fresh air undergoes very small flow resistance by virtue of the arrangement that each through hole 14j is arranged to become axially aligned with its corresponding through hole 14i when the driven pulley 14 has its minimum pitch diameter. To be concrete, when the driven pulley 14 has a minimum pitch diameter, that is, when the driving wheel 3 is rotating at a low speed, the through holes 14j and 14i become axially aligned. Therefore, the air undergoes a very small drop in its flow rate in passing the through holes 14j and 14i. On the other hand, when the driven pulley 14 has a maximum pitch diameter with the driving wheel rotating at a high speed, the through holes 14j and 14i become axially offset. However, also on this occasion the air passing the through holes undergoes a very small flow rate drop, since the fan 14d then rotates at a high speed.

A greater part of the fresh air guided toward the clutch outer fan 17d is guided into the fresh air passage 32 in front of the outer surface of the clutch outer element 17b, and then further guided through the upper communication hole 24 formed in the upper portion of the inner rear wall 6a' of the peripheral wall 6a of the transmission casing 6 and fed into the fresh air discharge passage 9, followed by passing through the lower communication hole 27 and then discharged into the atmosphere through the air outlet port 11 having openings in the opposite end faces of the protector 26. By virtue of the intervention of the fresh air discharge passage 9 between the upper communication hole 24 and the lower communication hole 27, intrusion of dust, mud, water, etc. into the transmission casing 6 can be effectively prevented.

Although in the illustrated embodiment the belt transmission according to the invention is applied to an automatic transmission, the invention is not limited to an automatic type, but of course may be applied to any other type belt transmission.

While the invention has been described in its preferred embodiment, obviously modifications and variations will occur to those skilled in the art within the scope of the present inventive concepts which are delineated by the following claims.

What is claimed is:

1. A belt transmission arranged in a vehicle having a body defining therein a substantially closed space, said belt transmission comprising:
   a drive pulley;
   a driven pulley;
   a belt engaging with said drive pulley and said driven pulley;
   a casing accommodating said drive pulley, said driven pulley, and said belt;
   air inlet port means having a free end serving as an air inlet port and opening in said substantially closed space for introducing fresh air therein into said casing;
   air outlet port means provided in said casing for discharging air from said casing;
   fan means provided on at least one of said drive pulley and said driven pulley and rotatable in unison therewith;
   said air inlet port means and said air outlet port means being disposed such that fresh air is sucked into said casing through said air inlet port means as said fan means rotates, to cool at least said drive pulley, said belt and said driven pulley, and is discharged from said casing through said air outlet port means.

2. The belt transmission as claimed in claim 1, wherein said casing is substantially horizontally disposed and includes a wall located at a downstream side in air flow of said casing and extending substantially transversely and substantially vertically of said casing, said air outlet port means comprising a first communication hole formed in said wall and opening in said casing at an upper location, an air discharge passage extending along said wall and substantially transversely and substantially vertically of said casing, a second communication hole formed in said casing at a level lower than said first communication hole, and an air outlet port opening in the atmosphere, said air discharge passage communicating with the interior of said casing through said first communication hole and with said air outlet port through said second communication hole, respectively, said first communication hole and said second communication hole being offset transversely of said casing.

3. The belt transmission as claimed in claim 1, wherein said casing is substantially horizontally disposed, said casing having a first lateral wall and a second lateral wall arranged opposite each other and an inner transverse wall and an outer transverse wall, both transversely extending between said first and second lateral walls at a downstream side in air flow of said casing, said air outlet port means comprising a communication hole formed in said inner transverse wall and opening in said casing, an air discharge passage defined between said inner transverse wall and said outer transverse wall, said air discharge passage communicating at one end with the interior of said casing through said communication hole, and an air outlet port opening in the atmosphere and communicating with another end of said air discharge passage, said inner transverse wall and said outer transverse wall each being formed integrally on at least one of said first and second lateral walls.

4. The belt transmission as claimed in claim 1, wherein said driven pulley includes said fan means and a pair of driven face elements disposed concentrically and opposite each other and carrying said belt wound thereon, said driven face elements each having a plurality of through holes arranged circumferentially thereof.

5. The belt transmission as claimed in claim 4, wherein one of said driven face elements is axially movable relative to the other driven face element, said through holes being disposed to be located radially inwardly of an inner peripheral surface of said belt even when said one driven face element is located at a maximum distance from the other driven face element.

6. The belt transmission as claimed in claim 1, which is arranged in a vehicle having a body cover, a seat arranged on said body cover, and a substantially closed space defined by said body cover and said seat, and wherein said air inlet port means has an air inlet port opening in said substantially closed space for introducing fresh air therein into said casing.

7. A belt transmission arranged in a vehicle having a body defining therein a substantially closed space, said belt transmission comprising:
   a drive pulley;
   a driven pulley;
   a belt engaging with said drive pulley and said driven pulley;
   a casing accommodating said drive pulley, said driven pulley, and said belt,
      said casing being substantially horizontally disposed and including a wall located at a downstream side in air flow of said casing, said wall extending substantially transversely and vertically of said casing;
   air inlet port means having an air inlet port opening in said substantially closed space for introducing fresh air therein into said casing;
   air outlet port means provided in said casing for discharging air from said casing, said air outlet port means comprising:
      a first communication hole formed in said wall and opening in said casing at an upper location,
      an air discharge passage extending along said wall substantially transversely and substantially vertically of said casing,
      a second communication hole formed in said casing at a level lower than said first communication hole, and
      an air outlet port opening in the atmosphere, said air discharge passage communicating with the interior of said casing through said first communication hole and with said air outlet port through said second communication hole, respectively,
      said first communication hole and said second communication hole being offset transversely of said casing;
   fan means provided on at least one of said drive pulley and said driven pulley and rotatable in unison therewith;
   said air inlet port means and said air outlet port means being disposed such that fresh air is sucked into said casing through said air inlet port means as said fan means rotates, to cool at least said drive pulley, said belt and said driven pulley, and is discharged from said casing through said air outlet port means.

8. The belt transmission as claimed in claim 7, wherein said air outlet port of said air outlet port means comprises a pair of openings opening in opposite lateral sides of said casing.

9. A belt transmission arranged in a vehicle having a body defining therein a substantially closed space, said belt transmission comprising:
a drive pulley;
a driven pulley;
a belt engaging with said drive pulley and said driven pulley;
a casing accommodating said drive pulley, said driven pulley, and said belt, said casing being substantially horizontally disposed and having:
a first lateral wall and a second lateral wall arranged opposite each other, and
an inner transverse wall and an outer transverse wall, both transverse walls extending between said first and second lateral walls at a downstream side in air flow of said casing;
air inlet port means having an air inlet port opening in said substantially closed space for introducing fresh air therein into said casing;
air outlet port means provided in said casing for discharging air from said casing, said air outlet port means comprising:
a communication hole formed in said inner transverse wall and opening in said casing,
an air discharge passage defined between said inner transverse wall and said outer transverse wall, said air discharge passage communicating at one end with the interior of said casing through said communication hole, and
an air outlet port opening in the atmosphere and communicating with another end of said air discharge passage,
said inner transverse wall and said outer trnasverse wall each being formed integrally on at least one of said first and second lateral walls;
fan means provided on at least one of said drive pulley and said driven pulley and rotatable in unison therewith;
said air inlet port means and said air outlet port means being disposed such that fresh air is sucked into said casing through said air inlet port means as said fan means rotates, to cool at least said drive pulley, said belt and said driven pulley, and is discharged from said casing through said air outlet port means.

10. The belt transmission as claimed in claim 3 or 9, which is combined with an engine having a transmission cover, and wherein one of said first and second lateral walls is formed by part of said transmission cover.

11. The belt transmission as claimed in claim 3 or 9, wherein at least one of said inner transverse wall and said outer transverse wall of said casing comprises a first portion formed integrally on one of said first and second lateral walls of said casing and extending toward the other lateral wall, and a second portion formed integrally on the other lateral wall and extending toward said one lateral wall, said first and second portions being joined together.

12. A belt transmission arranged in a vehicle having a body defining therein a substantially closed space, said belt transmission comprising:
a drive pulley;
a driven pulley;
a belt engaging with said drive pulley and said driven pulley;
said driven pulley having a pair of driven face elements disposed concentrically and opposite each other and carrying said belt wound thereon,
said driven face elements each having a plurality of through holes arranged circumferentially thereof,
one of said driven face elements being axially movable relative to the other driven face element,
said through holes being disposed radially inward of an inner peripheral surface of said belt even when said one driven face element is located at a maximum distance from the other driven face element;
a casing accommodating said drive pulley, said driven pulley, and said belt;
air inlet port means having an air inlet port opening in said substantially closed space for introducing fresh air therein into said casing;
air outlet port means provided in said casing for discharging air from said casing;
fan means provided on said driven pulley and rotatable in unison therewith;
said air inlet port means and said air outlet port means being disposed such that fresh air is sucked into said casing through said air inlet port means as said fan means rotates, to cool at least said drive pulley, said belt and said driven pulley, and is discharged from said casing through said air outlet port means.

13. The belt transmission as claimed in claim 5 or 12, wherein said driven pulley further includes means responsive to axial movement of said one driven face element for varying the circumferential phase of said one driven face element with respect to the other driven face element, said phase varying means being adapted to drive said one driven face element so that said through holes in said one driven face element each become axially aligned with a corresponding one of said through holes in the other driven face element when said one driven face element becomes located at a minimum distance from the other driven face element.

14. A belt transmission arranged in a vehicle having a body cover, a seat arranged on said body cover, and a substantially closed space defined by said body cover and said seat, said belt transmissiion comprising:
a drive pulley;
a driven pulley;
a belt engaging with said drive pulley and said driven pulley;
a casing accommodating said drive pulley, said driven pulley, and said belt;
air inlet port means having an air inlet port opening in said substantially closed space for introducing fresh air therein into said casing;
air outlet port means provided in said casing for discharging air from said casing;
fan means provided on at least one of said drive pulley and said driven pulley and rotatable in unison therewith;
said air inlet port means and said air outlet port means being disposed such that fresh air is sucked into said casing through said air inlet port means as said fan means rotates, to cool at least said drive pulley, said belt and said driven pulley, and is discharged from said casing through said air outlet port means.

15. The belt transmission as claimed in claim 1, 7, 9, 12 or 14, wherein said air inlet port means has an outlet end opening in said casing at a location in the vicinity of said drive pulley, and said air outlet port means has an inlet end opening in said casing at a location in the vicinity of said driven pulley.

16. The belt transmission as claimed in claim 1, 7, 9, 12 or 14, in combination with an engine having a crankcase and a transmission cover arranged adjacent to said crankcase,
   said casing being formed by part of said crankcase, part of said transmission cover and an exclusive wall portion,
   said part of said transmission cover having a first molding extending integrally therefrom,
   said exclusive wall portion having a second molding extending integrally therefrom and joined with said first molding,
said air outlet port means including an air discharge passage defined between said first molding and said second molding, and an air outlet port opening in the atmosphere and communicating with the interior of said casing through said air discharge passage.

17. The belt transmission as claimed in claim 1, 7, 9, 12 or 14, wherein said air inlet port means further include an air intake passage defined by part of said casing and opening in said casing at a location in the vicinity of said drive pulley, and tubing means connecting said air inlet port with said air intake passage.

18. The belt transmission as claimed in claim 1, 7, 9, 12 or 14, further including a rib extending from an inner wall surface of said casing at a location immediately upstream in air flow of said driven pulley, said rib extending along part of an outer periphery of said driven pulley and located in said belt for dispersively distributing fresh air over a greater part of the outer periphery of said driven pulley.

19. The belt transmission as claimed in claim 7, 9, 12 or 14, wherein said casing has an inner peripheral surface thereof formed with a plurality of heat collecting fins.

* * * * *

UNITED STATES PATENT AND TRADEMARK OFFICE
CERTIFICATE OF CORRECTION

PATENT NO. : 4,531,928

DATED : July 30, 1985

INVENTOR(S) : Yasuo Ikenoya

It is certified that error appears in the above-identified patent and that said Letters Patent is hereby corrected as shown below:

column 10, line 65: after "claim" insert --2 or--

*Signed and Sealed this*

*Eighteenth* Day of *February 1986*

[SEAL]

Attest:

DONALD J. QUIGG

*Attesting Officer*

*Commissioner of Patents and Trademarks*